INVENTOR
R. G. LeTourneau
ATTORNEYS

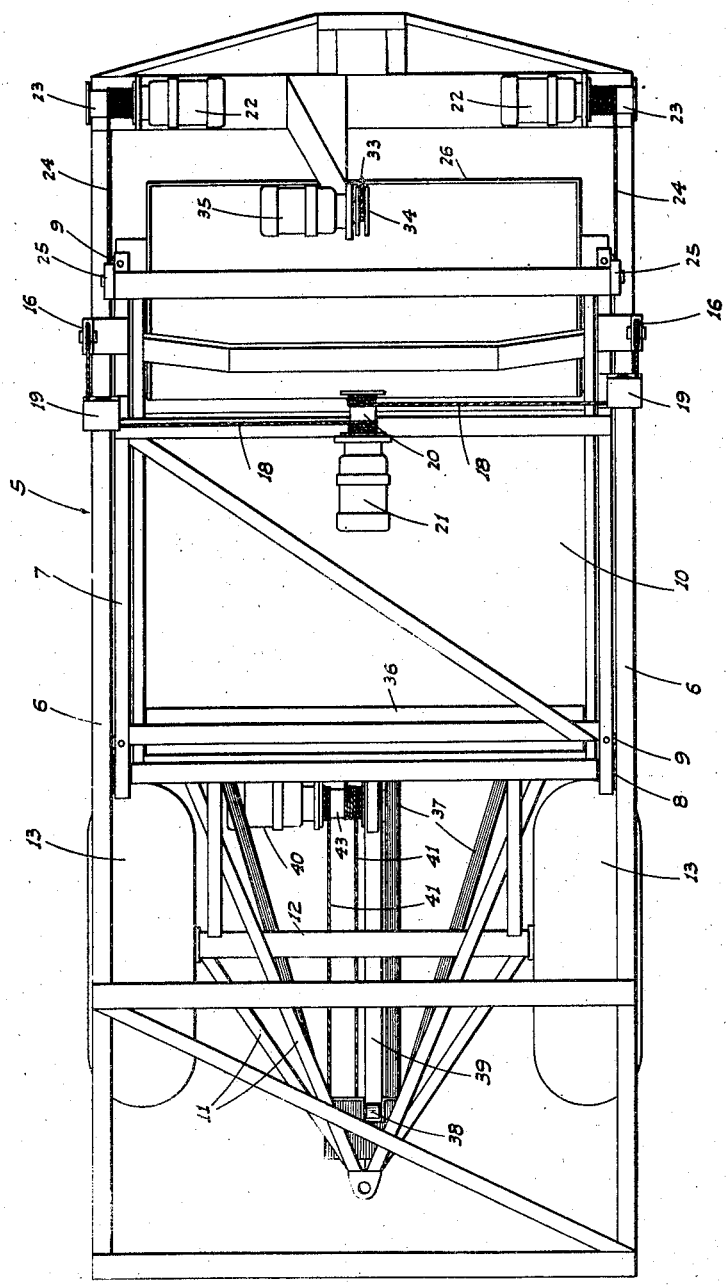

Patented Aug. 20, 1946

2,406,300

UNITED STATES PATENT OFFICE 2,406,300

SCRAPER

Robert G. Le Tourneau, Peoria, Ill., assignor to R. G. Le Tourneau, Inc., Stockton, Calif., a corporation of California Application June 18, 1945, Serial No. 600,154

6 Claims. (Cl. 37—126)

This invention is directed to an earth working implement, particularly an earth scraper of the carry type, i. e. a scraper operative to dig, load, carry, and discharge earth.

One of the objects of this invention is to provide a carry-type scraper which is self-propelled.

It is also an object of this invention to construct a self-powered carry-type scraper which is designed to be loaded, selectively, by movement of the implement resulting from wheel traction, or by independent powered movement of the bowl assembly relative to a main supporting frame, or loaded by a combination of wheel traction and said independent powered movement of the bowl assembly.

Another object of the invention is to provide a self-propelled carry type scraper which comprises, with a tractor coupled in unitary draft relation to a trailing main frame, a carriage mounted on and movable lengthwise of the main frame; a wheel supported bowl assembly fixed beneath and movable with the carriage; power means operative to move the carriage along the main frame; and a front apron suspended from the main frame and adapted to cooperate with the bowl assembly at the front.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 4 is a plan view of the implement.

Figure 1:
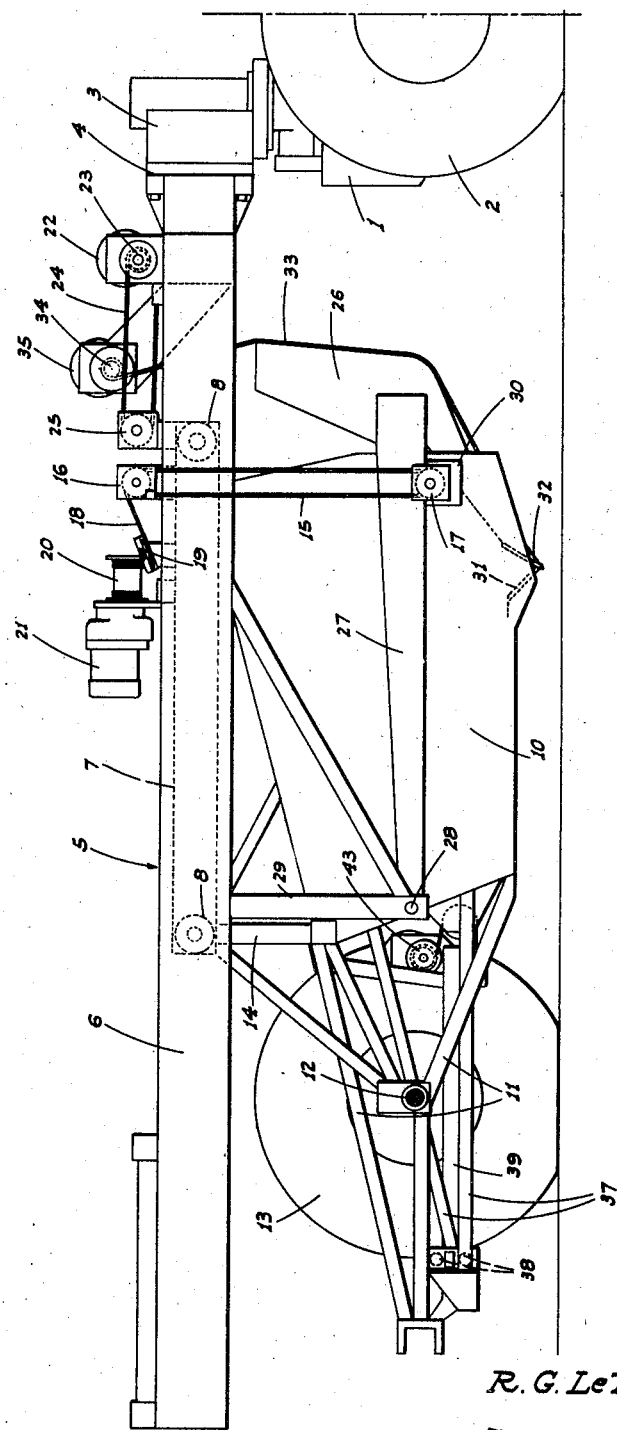
Figure 1 is a side elevation of the implement in carrying position.

Referring now more particularly to the characters of reference on the drawings, the implement comprises a tractor, indicated in part at 1 in Fig. 1, and which tractor is preferably of the two-wheel "Tournapull" type, supported by a pair of transversely spaced ground engaging driving wheels 2. Adjacent its rear end the tractor 1 is fitted with a combination draft coupling and power steering unit, indicated generally at 3, which is connected, as at 4, centrally with the forward end of a trailing main frame 5.

The main frame 5 is of open type, elongated lengthwise of the direction of travel, and includes transversely spaced, substantially horizontal side beams 6. The side beams 6 are inwardly facing channels, and a substantially rectangular carriage 7 is supported from the side beams 6 for movement lengthwise of the main frame, by means of rollers 8 which engage and ride in the channels of said side beams 6. Side thrust rollers 9 maintain proper alinement of the carriage 7 and prevent binding thereof in the channeled side beams.

The main frame 5 is of substantially greater length than the carriage 7, whereby the latter is capable of a relatively long travel within said main frame.

A forwardly opening earth receiving bowl 10 is disposed beneath the carriage 7, and at its rear end said bowl is fitted with a rearwardly projecting frame assembly 11 which carries an axle 12, on opposite ends of which are mounted the rear ground engaging, transversely spaced wheels 13 of the implement. The frame assembly 11 includes an upstanding portion 14 pivotally connected at its upper end to the carriage 7 at the rear for swinging movement about the axis of the rear rollers 8.

Adjacent its forward end and on opposite sides the bowl 10 is suspended from the corresponding end of the carriage 7 by lift cables 15 which are reeved between sheave blocks 16 on the carriage and sheave blocks 17 on the outsides of the bowl. From the sheaves 16 the pull leads 18 of the cables 15 extend rearwardly, pass about direction-changing sheaves 19, and thence extend laterally inwardly to oppositely wound connection with the cable drum 20 of an electrically actuated reversible power winch, indicated generally at 21, mounted on the carriage 7 adjacent its forward end and substantially centrally of its sides. The electric power winch 21 is actuated, as are the other hereinafter described electric power winches of the implement, by means of an operator controlled circuit. The electric power winch 21, together with the other similar winches included in the implement, are not only reversible but are normally braked against rotation of the drum 20. The structural details of the electric power winches form no part of the present invention and any suitable type may be employed.

The unit comprising the carriage 7 and the wheel mounted bowl assembly pivotally connected thereto, as above described, are arranged to be power actuated in a forward direction and lengthwise of the frame 5 by means of the following mechanism:

A pair of reversible electric power winches, indicated at 22, are mounted on the main frame 5 at the front and include cable drums 23 each disposed on a transverse axis and substantially alined with the corresponding side beam 6. Cables 24 lead from the drums 23 rearwardly about upstanding sheaves 25 on the carriage at the front and adjacent the corners. After passing about the sheaves 25 the cables 24 extend forwardly to an anchor on the frame. While the above cable system is shown for the purpose of clarity as including only two lines, a multiple-line block and tackle system may be employed if greater power is desired. When the carriage 7 is adjacent the rear end of the main frame 5 the electric power units 22 can be actuated to cause forceful forward movement of said carriage, together with the bowl 10, relative to said main frame.

Ahead of the bowl 10 and adjacent the forward end of, but below the main frame 5, the implement includes a front apron 26 adapted to cooperate in closing relation with the forward end of the bowl 10 when the latter is in an advanced position, as shown in Fig. 1; the mount for the apron 26 comprising the following:

A pair of heavy-duty transversely spaced supporting arms 27 are fixed in connection with the apron 26 at opposite ends, and extend rearwardly therefrom alongside the bowl 10. Adjacent the rear end of the bowl, when advanced, and to the outsides thereof the supporting arms 27 are pivoted, at their rear ends, as at 28, to the lower end of rigid brackets 29 which are fixed in connection with and depend from the side beams 6 of the main frame 5. Intermediate their ends the supporting arms 27 pass between the lift cables 15 and the adjacent sides of the bowl; lowering movement of said arms below fully closed position of the apron 26 relative to the bowl 10 being prevented by stop blocks 30 secured to the sides of the bowl and onto which stop blocks the sheaves 17 are secured.

At its forward edge the bottom of the bowl 10 is fitted with a cutting or digging blade 31, while at its lower and rear edge the apron 26 is fitted with a complementary blade 32.

The apron 26 is vertically adjustably suspended from the main frame 5 by means of a cable 33 secured to said apron at the front and adjacent its lower edge, and thence extending upwardly in guided relation about a cable drum 34 of a reversible electric power winch 35 mounted on the main frame 5 adjacent its forward end and substantially centrally of the sides thereof.

The bowl 10 is provided with a forwardly movable end gate 36 normally disposed in the rear end of the bowl and forming the back wall thereof. However, this end gate is mounted for powered forward movement in the bowl and to discharge a load therefrom, generally as follows:

A frame structure 37 extends rearwardly from the end gate 36 and includes a cluster of guide rollers 38 cooperating with a horizontal guide beam 39 in a frame assembly 11. The end gate 36, together with its frame structure 37, is power advanced and retracted from a reversible electric power winch 40 mounted in the frame assembly 11 and including an end gate advancing cable system 41 and an end gate retracting cable system 42, both of which systems connect in operative relation with the cable drum 43 of the winch 40.

The wheels 2 of the tractor, as well as the rear wheels 13 of the implement, include brakes (not shown), by means of which the operator may selectively brake the tractor wheels 2, or the rear wheels 13.

Operation

Figure 2:
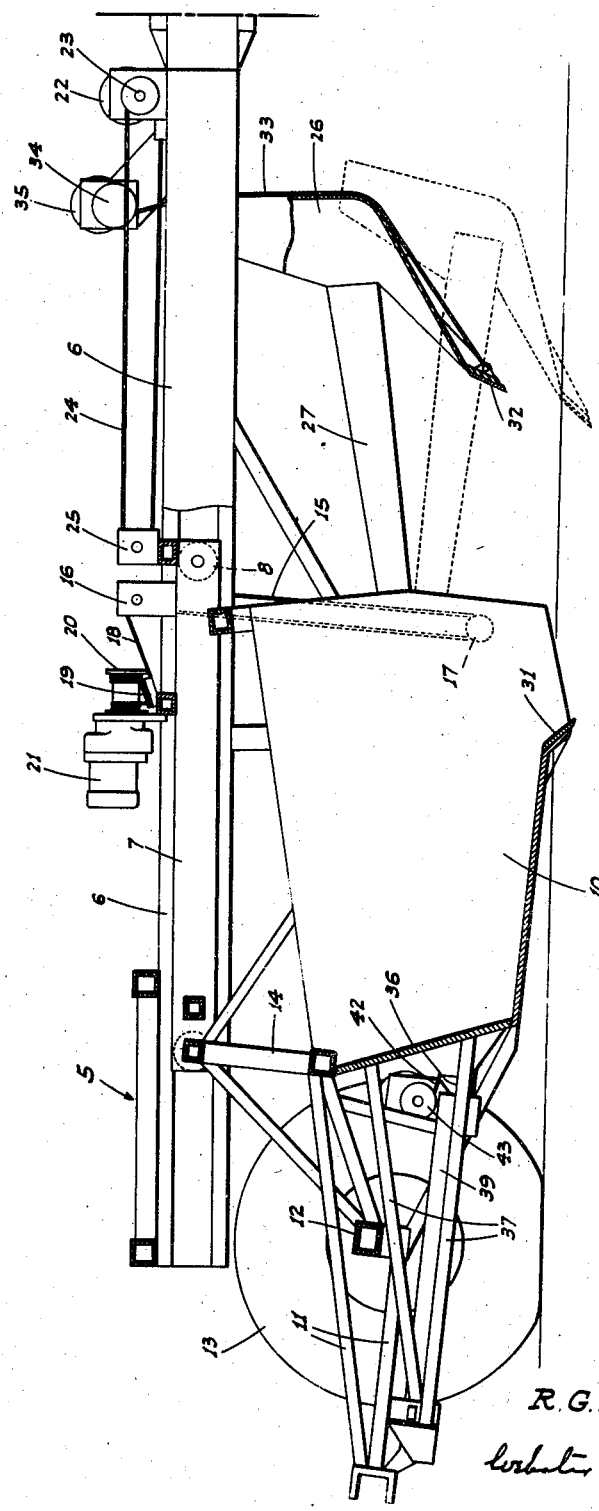
Figure 2 is a longitudinal sectional elevation of the implement in digging and loading position.
Figure 3:
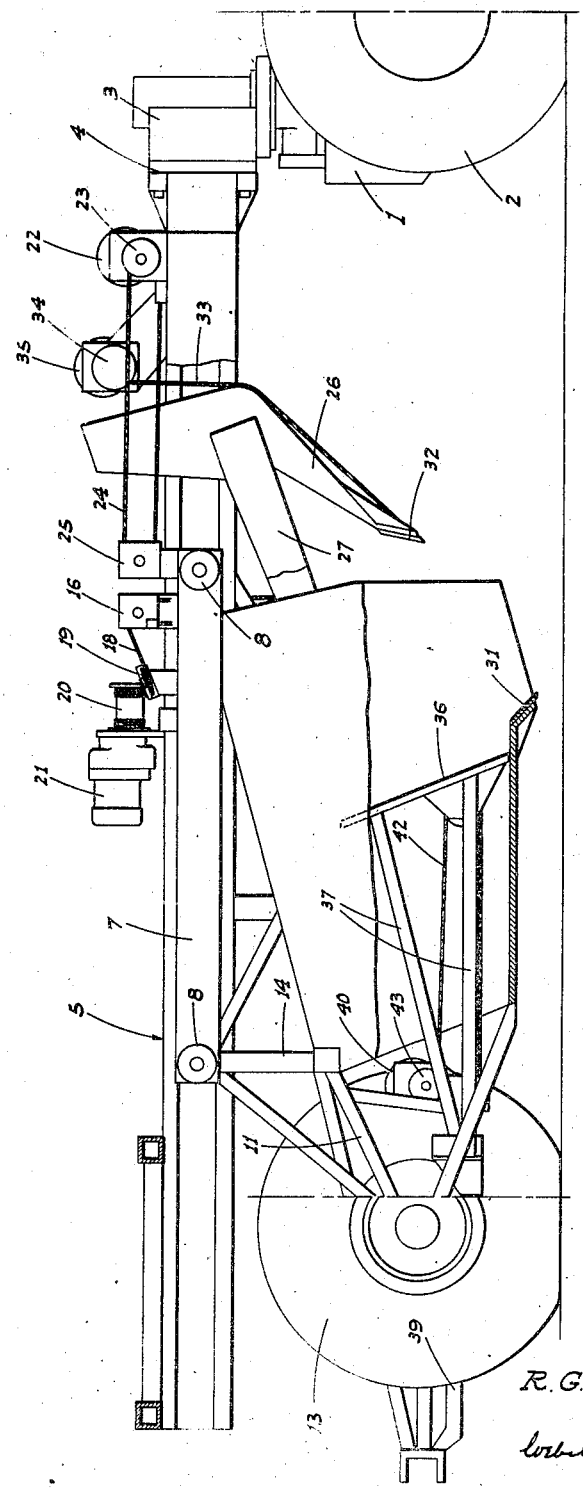
Figure 3 is a similar view but shows the implement in discharging position.

In operation of the above described scraper it may be loaded independently of wheel traction, as follows:

The apron 26 is partially raised by the cable 33 and the bowl 10 lowered by the cables 15 until the blade 31 is in ground engagement. Thereafter the tractor 1 is driven forwardly to a certain extent, which causes the carriage 7, together with the bowl 10, to move rearwardly relatively to the main frame 5; the power winches 22 being actuated at such time to permit the cables 24 to pay out as said carriage retracts. With the bowl 10 in such retracted and lowered position, the apron 26 is dropped into ground engagement, as shown in dotted lines in Fig. 2, and in which figure the bowl is also shown in its retracted and digging position. The operator then locks the front wheels 2, permitting the rear wheels 3 to remain unbraked, whereupon the electric power winches 22 are actuated in a direction to pull in the cables 24. This causes the carriage 7 to forcefully advance, carrying the bowl 10 with it. As the bowl advances the blade 31 digs into the earth and the dug earth flows into said bowl; the bowl continuing such advance until it comes into closing relationship with the lowered apron 26. Thereafter both the bowl and apron are raised to load carrying position, as shown in Fig. 1, so that the load may be transported to the point of discharge. When the implement reaches such point the apron 26 is opened and the end gate 36 is advanced, as shown in Fig. 3, for the purpose of discharging the load from the bowl. This discharge may be accomplished with the scraper moving in order to properly spread the load.

If it is desired to load the scraper partly by wheel traction and partly by independent powered movement of the carriage 7 and bowl 10, the procedure is as follows:

With the apron 26 is an elevated position, and with the bowl 10 retracted and lowered to digging position, the implement is driven forward through the medium of the drive wheels 2 until the blade 31 has filled the bowl 10 to the extent of the tractive capacity of said wheels 2. Thereafter the forward movement of the implement is stopped; the brakes on wheels 2 are set; the apron 26 lowered; and the carriage 7 and bowl 10 advanced the remaining distance to said apron by the independent power means comprising the electric power winches 22 and cables 24, which forcefully advance the carriage in the manner previously described. When the load has been acquired, it is transported and discharged in the same manner previously described.

It will also be evident that with the bowl 10 in an advanced position, the apron 26 and said bowl may also be used in the same manner as a conventional carry type scraper which loads solely by wheel traction.

From the foregoing description it will be readily seen that there has been produced such a device as substantially fulfills the objects of the invention as set forth in the appended claims.

While this specification describes in detail the present and preferred construction of the device, still in practice such deviations from such detail may be resorted to as do not form a departure from the spirit of the invention, as defined by said claims.

Having thus described the invention, the following is claimed as new and useful and upon which Letters Patent is desired:

1. A self-propelled scraper comprising, in unitary relation, a tractor, an elongated main frame disposed above the ground and coupled to the tractor in draft relation, an earth digging and carrying bowl unit extending below the main frame, means mounting the bowl unit in connection with the main frame for relative lengthwise movement, power means between the frame and bowl unit operative to effect such movement of the latter, and a front apron mounted in connection with the frame and disposed in cooperative relation ahead of the bowl unit, the bowl unit being open at the forward end and said end being closed by the apron when the bowl unit is moved lengthwise into engagement therewith; said front apron including transversely spaced side arms projecting rearwardly on opposite sides of the bowl, rigid depending brackets on the main frame to which said side arms are pivotally attached at the rear, and vertically adjustable means suspending the apron from said main frame.

2. A scraper as in claim 1 in which the bowl unit is pivoted in connection with said mounting means for vertical adjustment, and lift cables depending from said mounting means for attachment with the bowl on opposite sides; the side arms of the apron extending between the lift cables and adjacent sides of the bowl, and stop members on said sides of the bowl disposed to limit relative lowering of the side arms below a predetermined point.

3. A self-propelled scraper comprising, in unitary relation, a tractor, an elongated main frame disposed above the ground and coupled to the tractor in draft relation, a carriage mounted on the main frame for longitudinal sliding movement, an earth digging and carrying bowl unit extending below the carriage, a frame structure on the bowl unit secured to the carriage whereby the bowl unit moves with said carriage, ground engaging wheels on the bowl unit, and power means connected between the main frame and carriage to effect such movement thereof; said frame structure being pivotally attached to the carriage whereby the bowl unit is vertically swingable, and vertically adjustable suspension means extending between the carriage and bowl unit.

4. A self-propelled scraper comprising, in unitary relation, a tractor, an elongated main frame disposed above the ground and coupled to the tractor in draft relation, a carriage mounted on the main frame for longitudinal sliding movement, an earth digging and carrying bowl unit extending below the carriage, a frame structure on the bowl unit secured to the carriage whereby the bowl unit moves with said carriage, ground engaging wheels on the bowl unit, and power means connected between the main frame and carriage to effect such movement thereof; said frame structure mounting the bowl unit for vertical pivotal adjustment, and suspension means extending between the carriage and bowl unit.

5. A self-propelled scraper comprising, in unitary relation, a tractor, an elongated main frame disposed above the ground and coupled to the tractor in draft relation, a carriage mounted on the main frame for longitudinal sliding movement, an earth digging and carrying bowl unit extending below the carriage, means mounting the bowl unit for lengthwise movement with the carriage, power means connected between the main frame and carriage operative to effect such sliding movement of the latter, a vertically adjustable front apron suspended from the main frame in cooperative relation ahead of said lengthwise movable bowl unit, a forwardly movable end gate in the bowl unit, and end gate actuating means mounted for movement with the bowl unit.

6. A scraper comprising an elongated frame disposed above and for movement along the ground, a wheel-supported earth digging and carrying bowl unit extending below the frame, means mounting the bowl unit in connection with the frame for relative lengthwise movement, power means between the frame and bowl unit operative to effect such movement of the latter, and a front apron mounted in connection with the frame and disposed in cooperative relation ahead of the bowl unit; the bowl unit being open at the forward end and said end being closed by the apron when the bowl unit is moved lengthwise into engagement therewith; the bowl unit and front apron being secured in connection with said mounting means and frame, respectively, for independent and power actuated vertical adjustment.

ROBERT G. LE TOURNEAU.